(12) United States Patent
Flückiger et al.

(10) Patent No.: US 6,566,614 B1
(45) Date of Patent: May 20, 2003

(54) DRAFT SHIELD FOR A BALANCE AND BALANCE WITH A DRAFT SHIELD

(75) Inventors: Thomas Flückiger, Wetzikon (CH); Roger Leisinger, Zürich (CH); Armin Rüdisüli, Jona (CH); Aurelius Rindlisbacher, Dietlikon (CH)

(73) Assignee: Mettler-Toledo GmbH, Greifensee (CH)

( * ) Notice: Subject to any disclaimer, the term of this patent is extended or adjusted under 35 U.S.C. 154(b) by 0 days.

(21) Appl. No.: 09/807,708

(22) PCT Filed: Oct. 25, 1999

(86) PCT No.: PCT/EP99/08152
§ 371 (c)(1),
(2), (4) Date: Apr. 17, 2001

(87) PCT Pub. No.: WO00/25100
PCT Pub. Date: May 4, 2000

(30) Foreign Application Priority Data
Oct. 27, 1998 (DE) .......................................... 198 49 399

(51) Int. Cl.[7] .............................................. G01G 21/28
(52) U.S. Cl. ...................... 177/180; 177/239; 177/240; 177/241; 177/243; 312/114; 312/263
(58) Field of Search ................................. 177/180, 181, 177/182, 238–244; 312/114, 257.1, 263, 265.5, 265.6; 220/4.02, 780, 784

(56) References Cited

U.S. PATENT DOCUMENTS

| | | | | |
|---|---|---|---|---|
| 4,468,067 A | * | 8/1984 | Jenkins | 312/140 |
| 4,664,207 A | * | 5/1987 | Knothe et al. | 177/181 |
| 4,768,845 A | * | 9/1988 | Yeh | 312/263 |
| 4,862,978 A | | 9/1989 | Borchard | 177/180 |
| 5,345,043 A | * | 9/1994 | Luechinger et al. | 177/180 |
| 5,583,322 A | * | 12/1996 | Leisinger et al. | 177/180 |
| 5,669,522 A | * | 9/1997 | Million et al. | 177/181 |
| 5,874,694 A | * | 2/1999 | Ruedisueli | 177/180 |

FOREIGN PATENT DOCUMENTS

| | | |
|---|---|---|
| DE | 8507282 | 4/1987 |
| DE | 8907396 | 8/1989 |
| DE | 9302829 | 12/1993 |
| DE | 9313902 | 1/1994 |

* cited by examiner

Primary Examiner—Randy W. Gibson
(74) Attorney, Agent, or Firm—Friedrich Kueffner

(57) ABSTRACT

A draft shield for a balance that has a balance housing has a rear wall and a front wall panel arranged in a fixed position to the rear wall, at least two side wall panels and a top cover. The rear wall and the front wall panel are connected to a base. The base has a locking device and the balance housing has a complementary locking element. The locking device and the locking element cooperate with one another to releasably attach the draft shield to the balance housing, wherein the locking device and the locking element are configured to release the draft shield without moving the draft shield.

17 Claims, 4 Drawing Sheets

DRAFT SHIELD FOR A BALANCE AND BALANCE WITH A DRAFT SHIELD

BACKGROUND OF THE INVENTION

The present invention relates to a draft shield for a balance. The balance has a housing, and the draft shield comprises a base, a rear wall connected to the base, a front wall connected to the rear wall, at least two side walls, and a top cover. The invention further relates to a balance that is equipped with the inventive draft shield.

Draft-protection devices of the aforementioned kind are known, e.g., from EP-A-0 610 549, in which a draft shield can be releasably attached to the topside of a balance housing. However, the attachment requires that several different locking devices be provided in configurations that are compatible with the size of the respective draft shield that each locking device is designed for. As may be learned from the introductory part of the description of the aforementioned document, the only purpose of the attachment is to provide a secure connection of the draft shield to the balance housing, as compared to a draft shield that is only set down onto the top of the balance housing.

SUMMARY OF THE INVENTION

The object of the present invention is to simplify and thereby achieve cost savings in the manufacturing process of balances, particularly in cases where an assortment of different balances is to be manufactured and/or different versions of a draft shield are to be supplied for existing balances. A further objective of the invention is for the wall panels of the draft shield to be easily interchangeable, so that the wall panels themselves as well as the guide elements arranged in the draft shield are easy to clean.

To solve this problem, the invention provides a draft shield with a base comprising a locking device that is engaged in the balance housing and releasably connects the draft shield to the balance housing.

The inventive concept provides for a modular construction using a small number of parts that are produced in large quantities, i.e., economically, while making it possible to offer a range of different types of balances or to adapt a given type of balance to a wide range of different requirements. This obviates the need for different types of locking devices needed for each different size and configuration. Although it might be possible to work with as few as two types of locking devices, each of a given standardized configuration and standardized size, it is preferable to have only one single type of locking device.

In a preferred embodiment, the concept of a single type of locking device is put into practice by providing a latch slide that is movably guided in the bottom of the base so that it can be brought from a released position to a locked position. The latch slide has at least one projection or at least one cutout for the engagement with at least one matching recess or projection of the balance housing. It is to be understood that either the projection or the associated cutout or recess may be provided on the part of the draft shield or on the part of the balance housing, given that these elements are complementary to each other.

In contrast to an essentially known bayonet connection, the preferred way of releasing or fastening the draft shield is by means of a locking device that slides back and forth. This type of locking device provides an advantageous way of using draft shields of different geometric configurations depending on the desired application.

In most cases, a draft shield of this type is made of a polymer or other material that is susceptible to becoming electrostatically charged. Therefore, in order to avoid the build-up of an electrostatic charge, it is advantageous if the locking slide is made of an electrically conductive material, such as a metal.

In accordance with a further aspect of the invention, the problem described above is solved by providing the balance with at least one connector element for attaching an accessory module to the balance. In the case of a draft shield, it is advantageous for the balance to have at least one projection or, respectively, at least one recess in cooperative engagement with a corresponding part of the locking slide of the draft shield.

Concerning the static electricity that was mentioned above, the preferred countermeasure is to use an electrically conductive material, particularly a metal, for the projection or recess of the balance housing.

It is further beneficial, if the balance housing consists at least in part of a conductive material that is conductively connected or connectable with the electrically conductive projection or recess because a relatively large surface area of electrically conductive material is thereby made available to return the static electricity directly to the environment, provided that the atmospheric humidity is sufficient.

Also as an accessory module, either as an alternative or in addition to the draft shield, an attachment unit with electrical connections, e.g., a power supply, signal interface, A/D or D/A converter, may be connectable to the balance by means of the connector element.

According to a further aspect of the present invention, a draft shield is of a design that permits at least one of the walls of the draft shield to be brought from a closed position to a removed position. The concept may be carried out in a design of the draft shield where at least one of the walls is slidable from a closed position to a rest position and the slidable wall has a grip handle that protrudes towards the outside and is slanted at an angle from the vertical. This arrangement is based on the observation that, on the one hand, it makes the grip handle easier to grasp because it offers an approximately triangular free space that is conveniently accessible to the user. On the other hand, there is, surprisingly, a marked decrease in the tendency of the sliding wall to jam and get stuck. The reason may be that the slanted grip handle gives rise to a force component in the direction towards the guiding surface that is necessary for the wall to slide along and this force component causes the guiding plane to become better defined and thus works against jamming. The best results were obtained with the upper end of the slanted grip handle pointing in the direction towards the open rest position.

In a variation of the arrangement described above, the wall that can be brought from a closed position to a removed position can be taken off; and for the removed position, the draft shield is provided with a holder to store the wall.

With the slanted grip handle, it is advantageous if the grip handle has a dual function in that the upper end of the slanted grip handle is opposed by a stop that defines one of the positions, particularly the open position. Thus, the previous arrangement of providing a separate stop on the side of the grip handle is no longer necessary, and the accessibility of the grip handle is improved.

In combination with the slanted grip handle described above, columns are provided which, in an advantageous arrangement, form the stop for the slanted grip handle and define one of the positions, particularly the open position.

In accordance with the aforementioned concept of a modular configuration to facilitate cleaning or the exchange of parts, it is also preferable for the columns to have a releasable kind of attachment on the draft shield.

It is particularly advantageous if the column and/or the protuberances, ledges, or similar formations are arranged around the part of the wall that is closest to the open position, providing an effective means against the tendency of the wall to tilt and get jammed when it is slid into the open position.

Further details of the invention are presented in the following description of examples of embodiments that are illustrated schematically in the drawing.

DETAILED DESCRIPTION OF THE INVENTION

Figure 1:
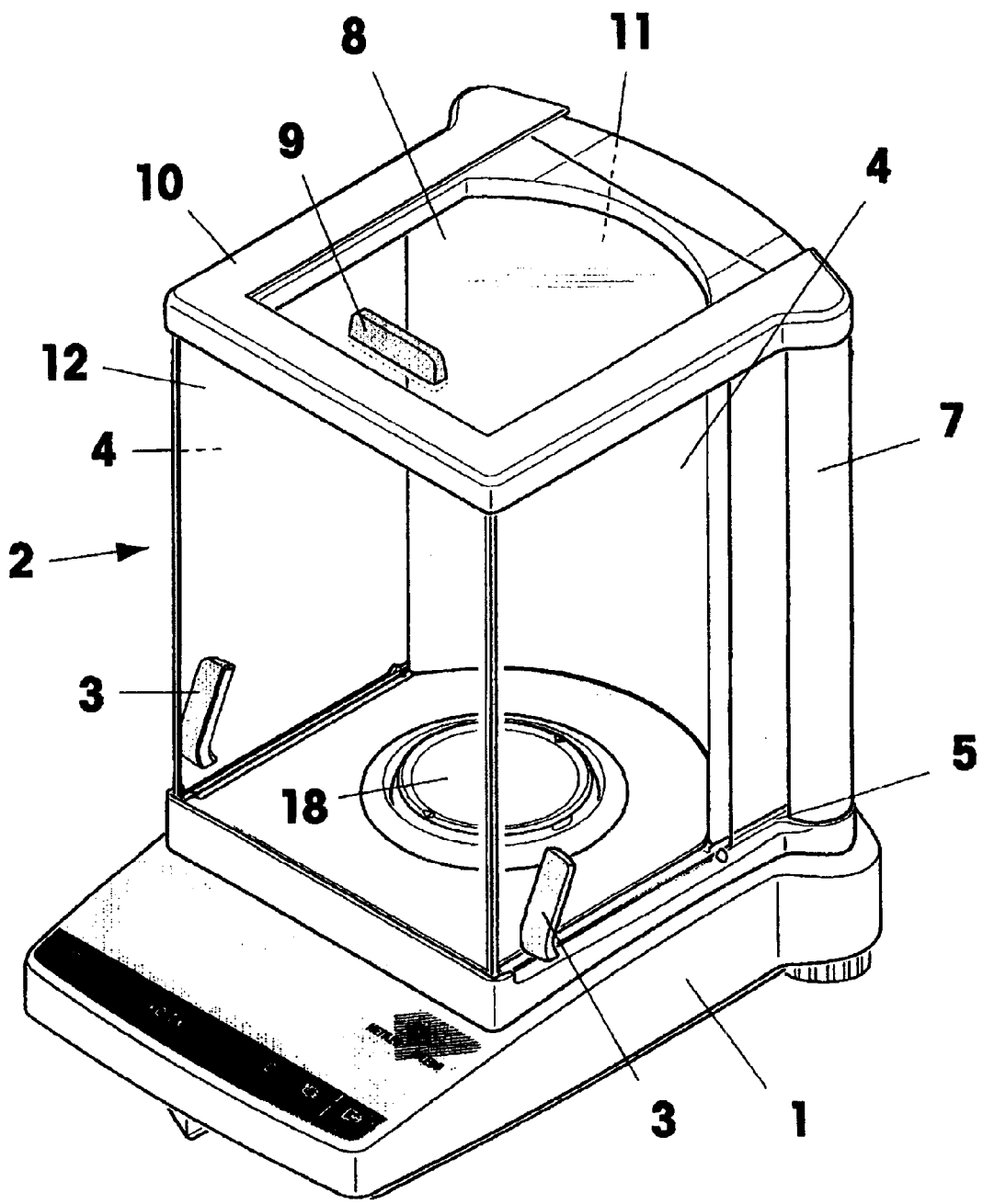
FIG. 1 represents a perspective view of a balance in accordance with the invention with an embodiment of the draft shield.

FIG. 1 illustrates a balance housing 1 with a weighing pan 18 and a draft shield 2 that has on opposite sides two slidable walls 4 with handle bars 3. The draft shield 2 is releasably fastened to the top of the balance housing 1 in a way that will be further described. As is shown for one of the walls 4, the wall panel 4 runs in guide slots 5 and 6. Likewise movably guided is a top cover 8 that is slidable by means of a grip handle 9 within an upper frame 10. The latter also carries the guide slots 6 and, in addition, provides a solid connection between a rigid rear wall 11 and a front wall 12. Releasably fastened columns 7 are arranged on both sides so that the walls 4 can be taken off.

Figure 2:
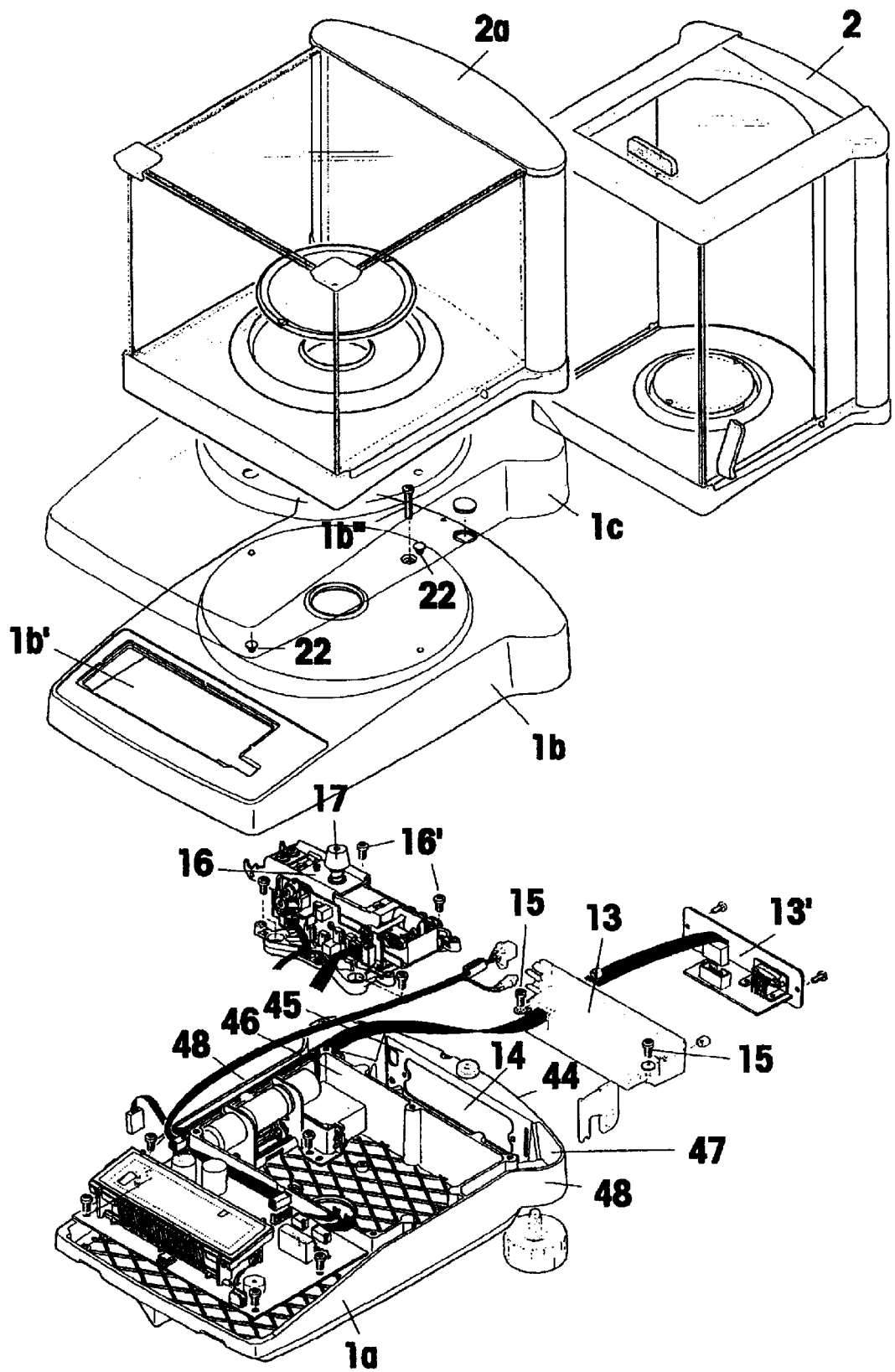
FIG. 2 represents an exploded view of the balance with different modules.

As shown in FIG. 2, the balance housing 1 (see FIG. 1) has a chassis base 1a. In order to allow static electricity to escape, particularly from the draft shield, the balance housing 1 consists of an electrically conductive material such as a carbon fiber material, but preferably a metal. Optionally, a housing top 1b with a window 1b' and a transparent protective cover 1c are mounted on the chassis base 1a. The housing top 1b is attached by means of at least one screw 1b" or a snap or plug-in connection, and the protective cover 1c is fitted over the housing top 1b. The protective cover 1c serves to protect the display and operator controls.

A separate compartment 45 is arranged on the rearward side 44, of the chassis base 1a. The compartment 45 is closed off against the interior of the chassis base 1a by a solid separator wall 46, against the back by the rear wall 47 and on both sides by the adjoining portions of the side walls 48 of the chassis base 1a. The compartment 45 serves to accommodate electrical connections such as a power supply, signal interface, A/D or D/A converter. The rear wall 47 has an opening 14. A mounting bracket 13 is designed to be installed from above in the compartment 45 and fastened by means of screws 15. The opening 14 allows a connector part 13' to be installed and bolted in place from the outside for an easy exchange.

The weighing cell 16 per se can be fastened to the chassis base 1a, e.g., by means of screws 16'. In addition to the mechanical components that are necessary for the weighing function, the weighing cell also comprises electronic components and at its topside has a support peg 17 for the weighing pan 18 (see FIG. 1). A ferrite ring (not shown in the drawing) that serves as a shield against electromagnetic fields may be placed over the support peg.

As already mentioned above, it is advisable for the chassis base 1a or the entire housing 1 (see FIG. 1) to be electrically conductive. In order to avoid the build-up of static charges and the harmful effects of differences in electrostatic potential, all essential parts of the entire balance according to the invention are electrically connected to each other.

As shown in FIG. 2, two different draft shield enclosures 2 or 2a can be connected alternatively to the balance housing 1a, 1b, 1c, depending on the type of balance that is to be produced. To accomplish this purpose, every draft shield 2 or 2a has a latch slide 21 (see FIGS. 3 and 4) with openings 21', 21" in the approximate shape of keyholes. The collars of collared bolts 22 (see FIG. 2) can be inserted into the wider portion of each of the openings 21', 21", and the latch slide 21 can be moved so that the narrower, slotted portion of each opening positions itself around the shaft of a collared bolt 22 and underneath the enlarged head or collar, thus holding the draft shield in place. Given that the latch slide 21 for practical reasons is made of an electrically conductive material, it is advantageous if the collared bolts 22 that are fastened to the balance housing 1 are likewise made of a conductive material and thus conduct the static charges to the housing 1. An opening 37' on the draft shield base 27 serves to accommodate a detent element 37.

A sheet metal floor plate 49 serves to equalize the electrostatic potential between the different parts and is conductively connected through the detent element 37 to the latch slide 21.

Because the latch slide 21 should not add to the height of the draft shield, it is advantageous if the latch slide has, e.g., a round opening 23 to serve as a handle by which the slide can be pushed in or out. As indicated by dotted lines in FIG. 3, the latch slide 21 may be guided by a guide track 24 and/or by guide pins 25 that are engaged in guide slots 26 of the latch slide 21. All of the guide elements 24, 25 are configured as parts of a base 27 of the draft shield 2 or 2a.

Around its upper border, the base 27 is equipped with holders 28 for the walls of the draft shield 2 or 2a (see FIGS. 3, 4), so that the base 27 could be used as a modular part of version 2 as well as version 2a of the draft shield. A pair of identically shaped columns 7a are provided for holding the walls together. The columns 7a are seated at one end on a projection 29 (for this purpose, the bottom of column 7a has a recess at least as deep as the height of the projection 29). In FIG. 4, the column 7 is attached by means of a fastener element 30 that forms a snap connection to a complementary fastener element (not shown) of the cover frame 10.

Figure 3:
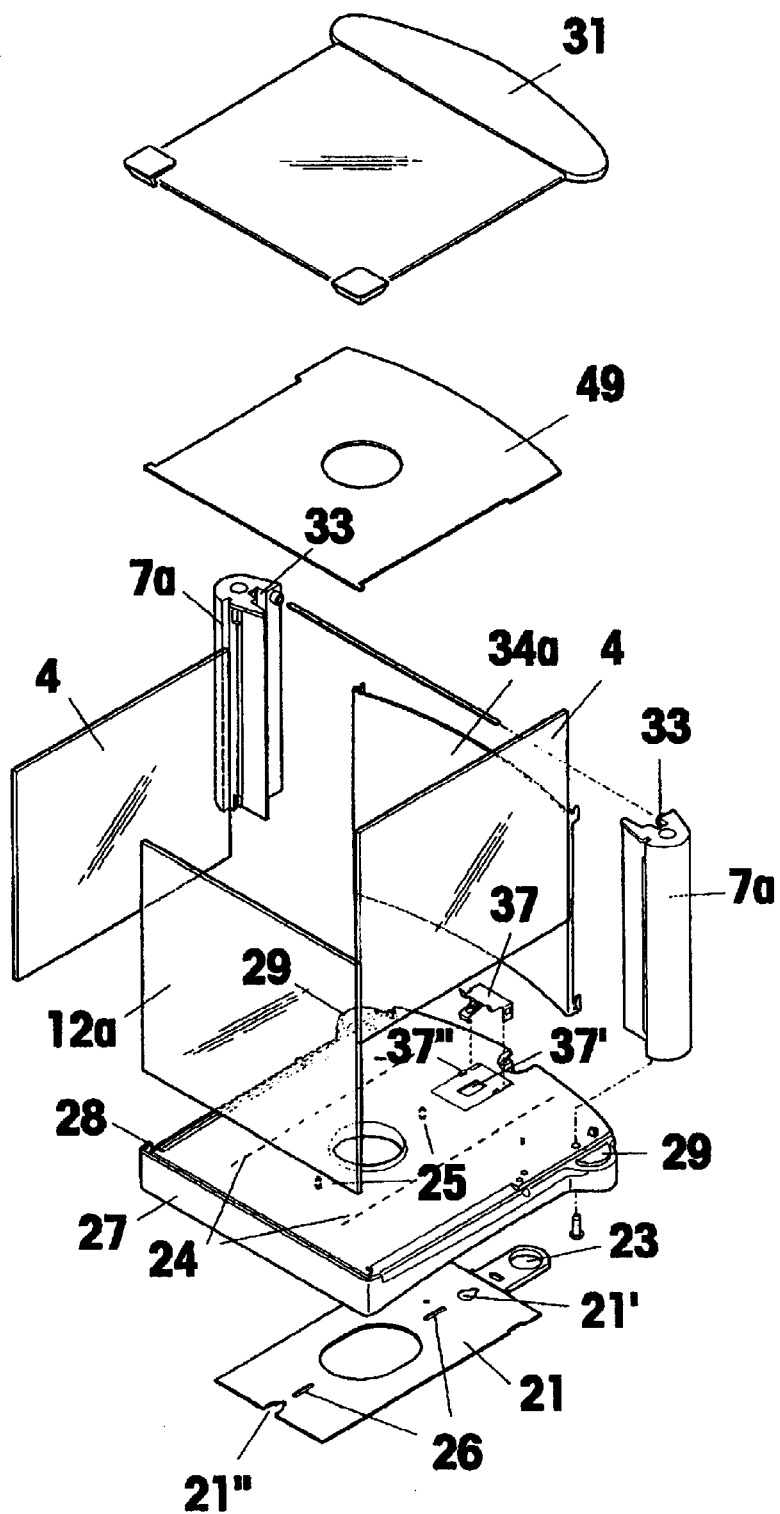
FIGS. 3 and 4 each represent a draft shield module, likewise in an exploded view.
Figure 4:
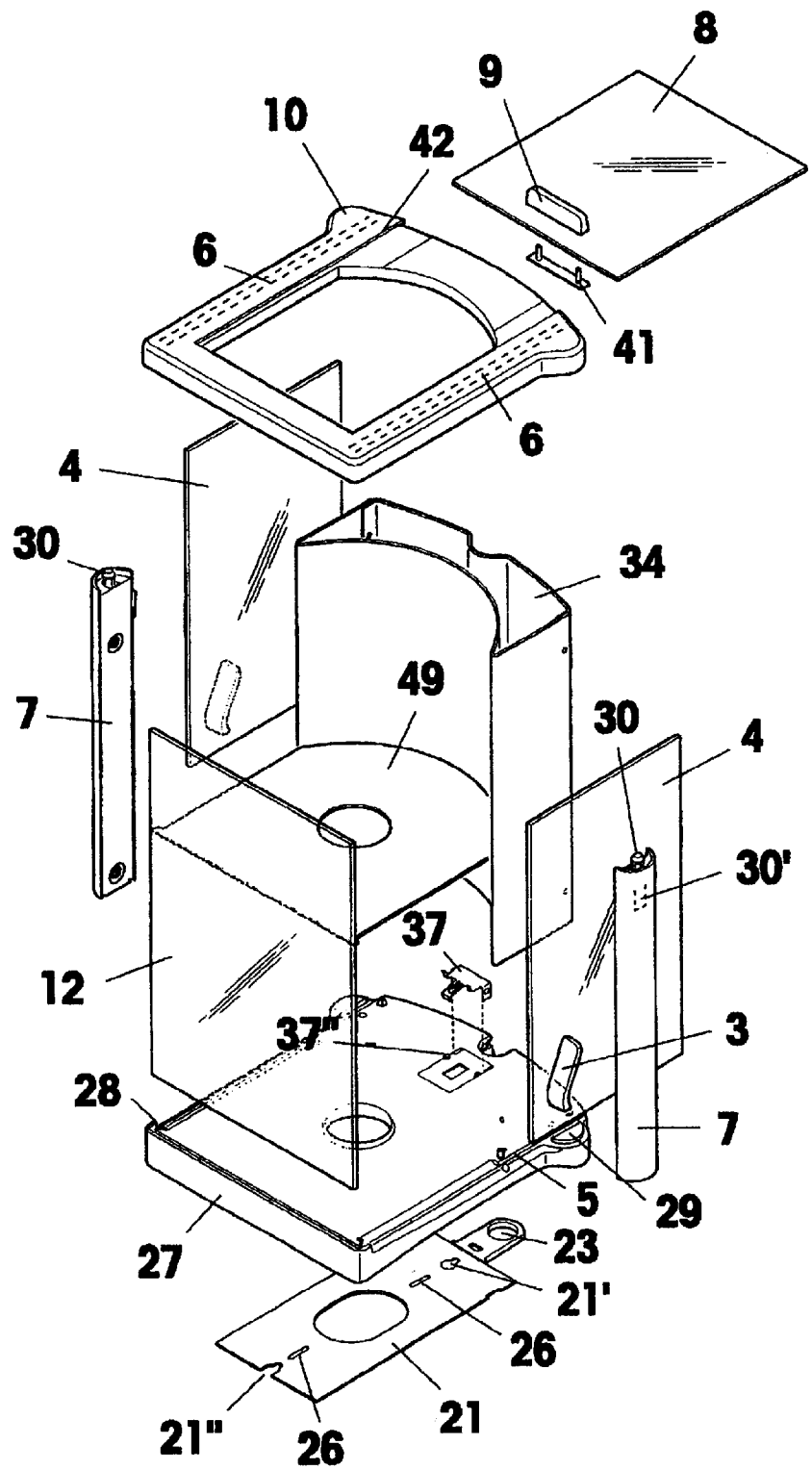

For increased rigidity, the two columns 7a in FIG. 3 are connected to each other by a rear wall 34a. The columns 7a together with the rear wall provide a pocket-like holder 33 into which one of the side walls 4 can be inserted when it is in its removed condition. After the top cover 8 has been opened, the wall 4 can be taken out by pulling it upwards along a guide slot 5 that is vertical in this embodiment. The pocket-like holder 33 is a practical feature to keep the wall from being mislaid after it has been pulled out to free the access to the interior of the draft shield. The fact that at least one of the walls 4, and preferably both, are removable facilitates the cleaning of the walls as well as of the guide slots. Also, a simple way is provided for making the weighing compartment more accessible. And further, the holder 33 allows problem-free storage of the unused wall panels.

Some individual parts may be seen more clearly in the illustration of draft shield 2 in FIG. 4. In particular, the fastener element 30 is shown as having a pin that projects upwards out of the column 7, is spring-loaded by a spring 30', engages a corresponding opening in the frame 10 and thereby holds the column 7 in its vertical position.

If the sliding wall 4 is now moved to the right from the position where it closes off the interior of the draft shield and into its opened position, the end of the wall 4 on the right side runs out of the guide slot 5. By setting the grip handle 3 at an angle, a downward force component occurs in the direction towards the guide slot 5 when the grip handle is grasped. At the same time, this removes the load from the upper slot 6 so that jamming of the wall panel is prevented. The drawing also shows that the slanted arrangement provides an approximately triangular free space below the grip handle 3, which makes it easier to take hold of the grip handle. Finally, as a practical point, the grip handle is arranged so that its upper end runs against the column 7, which thus acts as a limiting stop when the wall panel 4 reaches the end of its allowed travel path.

Concerning the top cover panel 8, FIG. 4 illustrates how the grip handle 9, if needed for moving the top cover panel 8, can be attached to the top cover panel 8 by means of a plug-in holder 41. One of the guide slots 42 for the top cover panel 8 is shown with particular clarity in FIG. 4.

Numerous modifications are conceivable within the scope of the present invention; for example, if a connector opening or lock opening such as the openings 21', 21" is described as belonging to one part and the respective complementary projection is described as belonging to another part, it is understood that the arrangement of opening and projection could also be reversed.

What is claimed is:

1. A draft shield (2, 2a) for a balance that has a balance housing (1), the draft shield (2, 2a) having a rear wall (11, 34, 34a) and a front wall panel (12, 12a) arranged in a fixed position to the rear wall (11, 34, 34a), at least two side wall panels (4) and a top cover (8), wherein the rear wall (11, 34, 34a) and the front wall panel (12, 12a) are connected to a base (27), the base (27) comprising a locking device and the balance housing having a complementary locking element, the locking device and the locking element cooperating with one another to releasably attach the draft shield (2, 2a) to the balance housing (1), wherein the locking device and the locking element are configured to release the draft shield (2, 2a) without moving the draft shield (2, 2a).

2. The draft shield (2, 2a) according to claim 1, wherein the draft shield (2, 2a) is not in gear with the balance housing (1) with any element hindering an essentially vertical movement of the draft shield (2, 2a) when the locking device is in its unlocked position.

3. The draft shield (2, 2a) according to claim 1, wherein a holder (33) shaped like a pocket is provided on the rear wall into which freed wall panels fit.

4. The draft shield (2, 2a) according to claim 1, wherein the base (27) has an underside, wherein the locking device is a latch slide (21) arranged on the underside and moveable from an open position to a locked position, the latch slide (21) having at least one interlocking element of the group consisting of projections and cutouts engaging at least one complementary-shaped interlocking element of the locking element of the balance housing (1).

5. The draft shield (2, 2a) according to claim 4, wherein the latch slide (21) consists of an electrically conductive material and is in electrical connection with the base (27).

6. The draft shield (2, 2a) according to claim 4, wherein the base comprises an elastic detent element (37) for securing at least one of the open and closed positions of the latch slide (21).

7. The draft shield (2) according to claim 1 wherein
the base (27) contains at least one guide slot (5) in which at least one of the side wall panels (4) is slidable from the closed position to a removed position,
the slidable wall panel (4) has a grip handle (3) slanted at an angle from the vertical and protruding outwards from the draft shield (2),
the upper end of the grip handle (3) slants towards the removed position, and
the end position of the slideable wall panel (2) is defined by the upper end of the grip handle (3) touching a limiting stop attached to a fixed part of the draft shield (2).

8. The draft shield according to claim 7, wherein the limiting stop is attached to the draft shield (2) with a releasable connection and, with the limiting stop released, no obstacle hinders the slideable wall panel (7) to be completely slided out of the guide-slot (5), such bringing said slideable wall panel (4) completely out of gear with the reminder of the draft shield (2).

9. The draft shield (2) according to claim 7, further comprising at least one column (7) near the rear wall that forms said limiting stop.

10. The draft shield according to claim 9, wherein projections (29) for holding the at least one column (7) are provided alongside the guide slots.

11. The draft shield (2) according to claim 9, wherein the at least one column (7) is attached to the draft shield (2) with a releasable connection.

12. The draft shield (2) according to claim 9, wherein the at least one column (7) is attached to the draft shield (2) with a connection selected from the group that consists of plug-in connections and snap fasteners (30).

13. The draft shield (2) according to claim 9, wherein one end of the at least one column (7) is held in place by a connector element of the draft shield (2) selected from the group consisting of projections (29) and recesses, and wherein further an opposite end of the at least one column (7) is provided with a releasable snap fastener (30) comprising an elastic element (30').

14. A balance comprising the draft shield (2, 2a) according to any one of the claims 4 to 6 further comprising at least one interlocking element cooperating with the latch slide (21) of the draft shield (2, 2a), said interlocking element being of the group consisting of projections and recesses and engaging at least one complementary-shaped interlocking element of the latch slide (21).

15. The balance according to claim 14, wherein the interlocking element consists of an electrically conductive material.

16. The balance according to claim 15, wherein at least a portion of the balance housing (1) interlocking with the interlocking element consists of an electrically conductive material.

17. The balance according to claim 14, further comprising a separate compartment (45) inside a chassis base (1a), the separate compartment (45) serving to accommodate at least one of the electrical circuits required for power supply, signal interface, analog/digital, and digital/analog converters.

* * * * *